No. 639,903. Patented Dec. 26, 1899.
H. MUELLER.
EEL GUARD FOR COCKS.
(Application filed Apr. 1, 1899.)
(No Model.)

Attest.
Nora Graham.
Ina Graham.

INVENTOR
H Mueller
by L. P. Graham
his attorney

THE NORRIS PETERS CO., PHOTO-LITHO., WASHINGTON, D. C.

UNITED STATES PATENT OFFICE.

HIERONYMUS MUELLER, OF DECATUR, ILLINOIS.

EEL-GUARD FOR COCKS.

SPECIFICATION forming part of Letters Patent No. 639,903, dated December 26, 1899.

Application filed April 1, 1899. Serial No. 711,431. (No model.)

*To all whom it may concern:*

Be it known that I, HIERONYMUS MUELLER, of Decatur, in the county of Macon and State of Illinois, have invented a certain Improved Eel-Guard for Cocks, of which the following is a specification.

It is the object of my invention to produce a cheap, simple, and effective barrier to the passage of eels from a main to service-pipes. The invention is exemplified in the structure hereinafter described, and defined in the appended claims, and the utility resides in part in the superior structure and in part in the facility with which the structure may be made.

Figure 1:
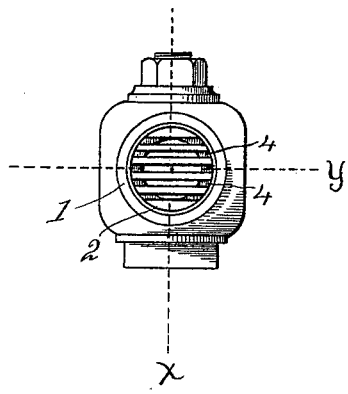
Figure 2:
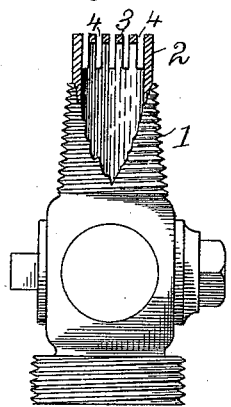
Figure 3:
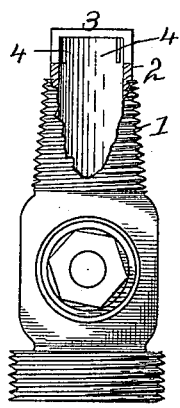
Figure 4:
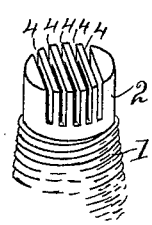

In the drawings forming part of this specification, Figure 1 is an end view of a cock embodying my improvements. Fig. 2 is a side view of the same with the barrier shown in section on line $x$ in Fig. 1. Fig. 3 is a similar view of the cock with the barrier in section on line $y$ in Fig. 1. Fig. 4 is a sketch in perspective of the barrier or guard.

The cock is made in any desired form and manner except for the barrier, and the barrier has peculiarities as follows: A hollow extension 2, having an end 3, is formed on or fastened to the threaded end 1 of the cock, and the end 3 is slotted in a direction parallel with the axis of the cock and the barrier. There is preferably a plurality of the slots 4, each parallel with every other, and the slots cut through the end 3 and lengthwise of the body of the extension, thus providing openings nearly if not quite equal in area to the capacity of the cock. In this instance the body of the guard is in the form of a hollow cylinder; but this is merely a form that is preferred, the essential feature being the slot or slots parallel with the longitudinal axis of the cock and with each other, extending through the end wall and into the sides of the barrier extension.

The slots are advisably formed by milling the otherwise-completed barrier extension, a mode of operation that is very expeditious and that produces superior results; but it is obvious that it is not impossible to form them in other ways. They provide maximum area of water-passage with minimum weakening of the barrier in whatever manner they may be formed.

While the guard was designed for the specific purpose of excluding eels from service-pipes, it is readily seen that its utility is not limited to this particular, as it will prevent the passage of bits of inanimate substances.

What I claim is—

1. A guard for cocks, comprising a hollow extension on the tap end of the cock provided with an end wall having a plurality of parallel slots lengthwise of the extension, substantially as set forth.

2. A guard for cocks, comprising a hollow extension on the tap end of the cock provided with an end wall, such extension having a plurality of parallel slots extending through its end and into its sides, substantially as set forth.

In testimony whereof I sign my name in the presence of two subscribing witnesses.

HIERONYMUS MUELLER.

Witnesses:
  MABEL CARSON,
  BARNA MCDANIEL.